United States Patent [19]

Liebal

[11] 4,184,865
[45] Jan. 22, 1980

[54] MOUNTING PLATE FOR A COMPRESSION MOULD PART

[75] Inventor: Eberhard Liebal, Kronach, Fed. Rep. of Germany

[73] Assignee: Messrs. J. Walter Co. Maschinen GmbH, Kronach, Fed. Rep. of Germany

[21] Appl. No.: 928,863

[22] Filed: Jul. 28, 1978

[30] Foreign Application Priority Data

Aug. 6, 1977 [DE] Fed. Rep. of Germany ....... 2735530

[51] Int. Cl.² .............................................. C03B 11/12
[52] U.S. Cl. ....................................... 65/319; 65/323; 65/356
[58] Field of Search .................. 65/167, 318, 319, 321, 65/323, 355, 356

[56] References Cited

U.S. PATENT DOCUMENTS 3,404,974  10/1968  Belentepe et al. ..................... 65/319

*Primary Examiner*—Arthur D. Kellogg
*Attorney, Agent, or Firm*—Louis E. Marn; Elliot M. Olstein

[57] ABSTRACT

The invention relates to a mounting plate, by means of which the lower part of the compression mould in a press, in particular a glass press, can be fixed on a carrier plate. A mounting plate of this type has a coolant path defined by a cavity in the form of a spiral coolant channel which runs approximately parallel to the bottom and top faces of the mounting plate, from the central region thereof towards its periphery. In this way, more heat may be removed by the coolant from the central region of the compression mould than from its peripheral region which is in any case more strongly affected by the cooling action from the outside. As a result, a more homogeneous temperature distribution is obtained in the mould.

10 Claims, 2 Drawing Figures

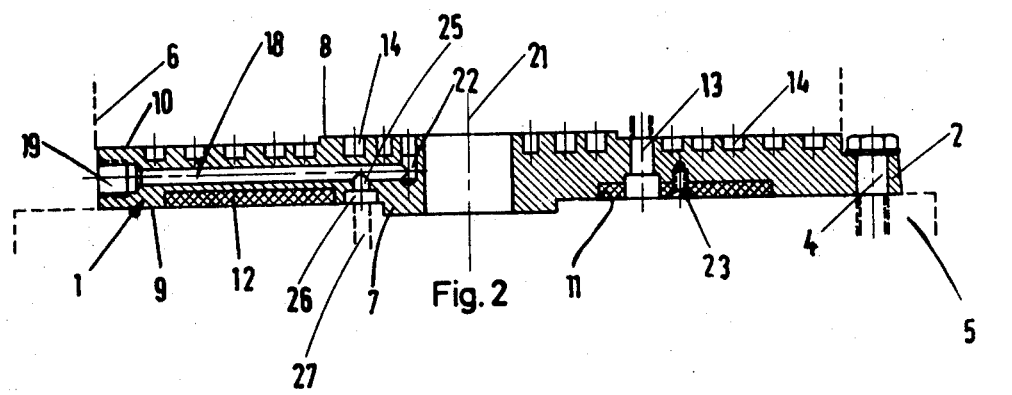
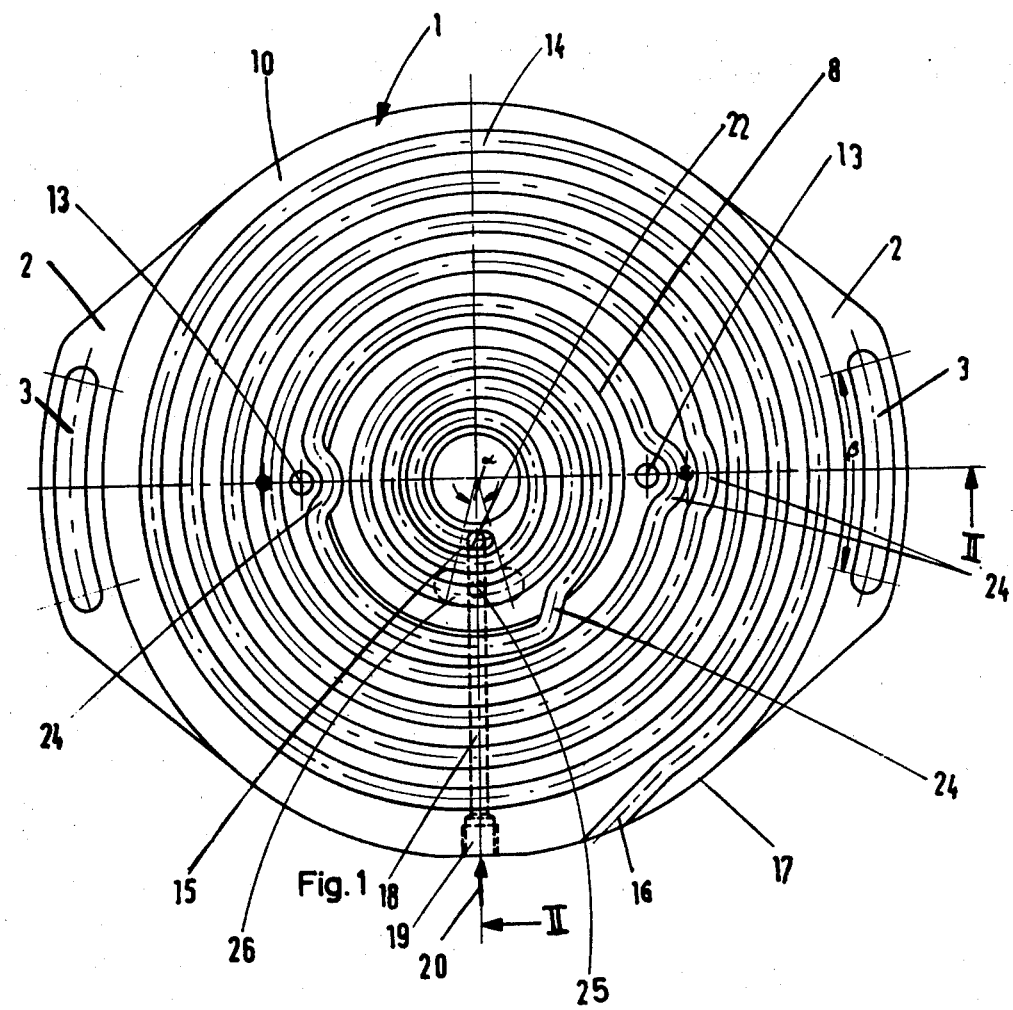

MOUNTING PLATE FOR A COMPRESSION MOULD PART

DESCRIPTION

The invention relates to a mounting plate for fixing the lower part of the compression mould on a carrier plate, in a press for processing a heated material the mounting plate having a cavity through which a coolant flows. The invention is particularly applicable to a glass press.

Particularly in the case of glass presses, there is the problem of having to support the lower part of the compression mould on the carrier plate in such a way that the temperature of the lower part of the compression mould does not vary widely across the region of the mould cavity, because of ulduly high or non-homogeneous heat removal. German Patent Specification No. 210,474, discloses providing the mounting plate for the lower part of the compression mould, for this purpose, with a cavity through which a coolant flows.

This procedure is satisfactory for moulds of relatively small diameter. However, when producing mouldings with larger dimensions, the problem then arises that heat is removed to a relatively large extent on the outside of the mould but, by contrast, the core of the mould, and hence also the central region of the moulding, remain too hot. Thus, difficulties car arise on release from the mould if either, before release from the mould the outer region of the moulding is excessively cooled down or, during release from the mould the temperature of the central region is still unduly high.

It is now the object of the invention to provide a mounting plate in which the difficulties mentioned can be largely eliminated and, in particular, a homogeneous temperature distribution can be achieved even in the case of mouldings of relatively large diameter.

Accordingly the present invention proposes a mounting plate for fixing the lower part of a compression mould on a carrier plate in a press for processing a heated material, the mounting plate having a coolant flow path in the form of a spiral coolant channel which runs substantially parallel to the bottom and top of the mounting plate from the central region thereof towards its periphery.

Advantageously, a radial feed passage leading to the periphery can be connected to that end of the coolant channel which is in the central region of the mounting plate, the feed passage advantageously being essentially formed by a radial blind bore.

The use of a helical coolant channel starting in the central region of the mounting plate has the advantage that the coolant first acts at the centre of the mounting plate and hence at the hottest region of the compression mould. From there, the coolant then flows radially outwards, being heated correspondingly, so that less heat is removed from the outer region of the lower part of the compression mould. This has the result that the temperature of the central region of the mould can be considerably lowered, as compared with known moulds, and a more homogeneous temperature gradient in the mould part can be achieved in addition.

A vertical coolant feed passage, which ends at the bottom face of the mounting plate and which can be aligned with the end of a corresponding coolant feed duct in the carrier plate is connected to the feed end of the coolant channel, which in general is in the central region of the mounting plate. For example, the feed duct in the carrier plate can be a corresponding bore which is supplied with cooling air from the axis of rotation of the carrier plate. With this design of mounting plate no special hoses or the like need to be connected to the mounting plate for supplying the coolant. Rather, the connection to the feed duct in the carrier plate is made merely by placing the mounting plate onto the carrier plate in the correct position. It is also possible here to close the vertical feed channel by fixing the mounting plate to the carrier in a position rotated by 180°, in which case the feed duct in the carrier plate and the vertical feed passage will then not be in alignment.

In a design of this type, it is advantageous when the cross-section of the vertical feed passage is widened in the region of the bottom surface of the mounting plate, in order thus to facilitate alignment of the feed passage to the coolant feed duct in the carrier plate.

In the embodiment of mounting plate with both a radial feed passage and a vertical feed passage, it can be advantageous when the vertical feed passage leads into the radial feed passage close to the inner end of the latter, because the vertical feed passage can then be fitted with relative ease. Furthermore, in such a design of the mounting plate, it is possible to feed the coolant, as desired, via the radial feed passage or the vertical feed passage, but if the vertical feed passage is used the outer end of the radial feed passage must be closed in some way, for example by means of a plug.

A particularly simple embodiment is obtained when the coolant channel is formed by a groove which opens into the top surface of the mounting plate; this groove can be provided in a simple manner, for example by milling.

The mounting plate may also, if desired, have on the underside an annular groove to receive a heat-insulating plate, for example an asbestos plate, in order to suppress heat transfer from the mounting plate to the carrier plate, and hence to keep heating of the carrier plate as low as possible.

One embodiment of the invention also has a circular centering boss in the centre of the top and/or bottom faces of the mounting plate and fixing means comprising at least two fixing slots in the shape of a circular arc along the periphery of the mounting plate. In this embodiment of the mounting plate, the lower part of the compression mould can in a simple manner be centred accurately with respect to the mounting plate, and this is particularly important when the coolant path is a helical coolant channel since, otherwise, the heat removal would take place non-homogeneously over the diameter of the lower part of the compression mould.

In the embodiment, explained above, where the mounting plate has both the fixing slots in the shape of a circular arc and also the presence of a vertical feed passage, it is advantageous when the widening of the cross-section of the vertical feed passage is formed approximately in the shape of a kidney and extends at least over an angular sector which corresponds in size to the angular sector of one of the circular arcuate fixing slots, since the mounting plate can then be rotated without difficulty, within the limits preset by the fixing slots, but the vertical feed passage remains nevertheless connected to the coolant feed duct in the carrier plate.

In order that the present invention may more readily be understood the following description is given of a preferred illustrative embodiment, with reference to the accompanying drawings in which:

FIG. 1 shows a plan view of a mounting plate according to the invention; and

FIG. 2 shows a section through the mounting plate, taken along the line II—II of FIG. 1.

As can be seen from the plan view of FIG. 1, the mounting plate 1 is essentially circular in shape. It has two diametrically opposite fixing lugs 2 which are provided with slots 3 which have the shape of a circular arc centred on the centre of the plate 1 and into which slots screws 4 can be inserted to fix it in position on a carrier plate 5 (which is shown in broken lines in FIG. 2).

For centering the mounting plate 1 relative to the carrier plate 5 and relative to the lower part 6 of the compression mould (indicated in broken lines in FIG. 2), the mounting plate 1 has, in the illustrative embodiment shown, in the centre of the underside and top a circular centering boss 7, 8 respectively, which projects a little beyond the respective bottom surface 9 or top surface 10 of the mounting plate 1.

On the bottom surface 9 of the mounting plate 1, is an annular groove 11 to receive a heat insulating plate 12, for example a ring of asbestos.

Bores 13 are provided for fixing the lower parts of the compression mould 6 to the mounting plate 1.

The essential characteristic of the mounting plate according to the invention is that it has, in the region of the top surface 10, a coolant channel 14 which is formed by a groove which gradually runs spirally outwards from its one end 15 close to the centre of the mounting plate 1 to terminate at its other end 16 in the region of the periphery 17 of the mounting plate 1. The groove 14 is open towards the top surface 10.

The end 15 of the helical groove coolant channel 14 is likewise connected to the periphery 17 of the mounting plate via a blind bore 18 which essentially runs radially. At the end 19 of the blind bore 18, serving as a feed channel, is an internal thread which is used to connect up a feed device for coolant, for example air, which enters the blind bore 18 along the direction indicated by the arrow 20.

The connection between the blind bore 18 and the inner end 15 of the helical groove coolant channel 14 is made by a bore 22 which runs parallel to the axis 21 of the mounting plate 1 and which extends only over the depth range from the groove or the coolant channel 14 down to the blind bore 18.

The asbestos ring 12 can be fixed in the groove 11, for example by means of countersunk screws 23.

As indicated in FIG. 2, the groove coolant channel 14 is covered on its top when the lower part 6 of the compression mould is in place, and as a result it is ensured that the coolant entering at 20 into the channel 14 passes first to the end 15 of the coolant channel 14 and then from there gradually along the coolant channel 14 to the outlet end 16 where the coolant, if it is air, simply emerges. If another coolant is used, a discharge line for the coolant can be connected at 16.

Fitting the centering boss 7 to the bottom surface 9, and the centering boss 8 to the top surface 10 of the mounting plate, has the advantage that the mounting plate 1 is accurately positioned when recesses corresponding to the centering bosses 7 or 8 are present in the carrier plate 5 or the lower part of the compression mould respectively; this also has the particular advantage that the heat removal from the underside of the lower part of the compression mould in fact takes place along the length of the coolant channel 14.

As clearly shown, in FIG. 1, the course of the coolant channel 14 does not have to be strictly helical. Rather, it is entirely possible to provide certain deviations such as at the points 24 if this is necessary because of the construction of the mounting plate, for example as in this case because of the presence of the fixing bores 13.

The mounting plate 1 shown in the drawing has, in addition to the radial feed passage along blind bore 18, also a vertical feed passage 25 which leads into this feed passage 18 and which is formed by a corresponding bore parallel to the axis of the plate 1. In the region of the bottom surface 9 of the mounting plate 1, the vertical feed passage 25 is provided with a widening 26 which, as can clearly be seen from the drawing, possesses a greater radial extent than the rest of the passage 25 and additionally is formed in the shape of a kidney, the angle $\alpha$, which the widening 26 subtends, at the centre of plate 1, at least, corresponding to the angle $\beta$ subtended at the centre by one of the arcuate fixing slots 3.

To feed coolant through the vertical feed passage 25, a corresponding duct 27, (shown in dotted lines in FIG. 2 in the form of a bore) is provided in the carrier plate 5, which duct 27 communicates with a corresponding source of coolant. For example, if the carrier plate 5 were a rotary table, a passage can be provided for this purpose in the corresponding bearing pillar for the rotary table, which passage communicates via horizontal bores with the duct 27.

If the vertical feed passage 25 is to be used for the coolant feed, the end 19 of the radial bore 18 will be closed by a plug or the like. It suffices then to place the mounting plate 1 onto the carrier plate 5 in the correct position, which can be seen from FIG. 2.

If, however, coolant is to be fed via the radial feed passage 18 to the coolant channel 14, a corresponding feed line is connected at 19 and the mounting plate 1 is fixed on the carrier plate 5 but when it has been rotated by 180° so that on the one hand the feed duct 27 in the carrier plate 5 is then closed by the bottom surface 9 of the mounting plate 1 and on the other hand the vertical feed passage 25 is closed by the top of the carrier plate 5, without special additional closing means being required for this purpose.

I claim:

1. A mounting plate for fixing the lower part of a compression mold on a carrier plate in a press for processing a heated material, the mounting plate having a top face, a bottom face, a coolant flow path means including a spiral coolant channel which runs substantially parallel to the bottom and top of said mounting plate from a first end at the central region of said mounting plate towards a second end at the periphery of said mounting plate, and a port means for said first end of said spiral coolant channel for connecting said spiral coolant channel to a source of coolant.

2. A mounting plate according to claim 1, wherein said coolant flow path means further includes a radial feed passage extending radially inwardly from the periphery of the mounting plate, to an inner end of said radial feed passage, said inner end of said radial feed passage being connected to said first end of the coolant channel.

3. A mounting plate according to claim 2, wherein said radial feed passage is essentially formed by a radial blind bore.

4. A mounting plate according to any one of the preceding claims, wherein said coolant flow path means further includes a vertical coolant feed passage which extends from the bottom face of the mounting plate and is adapted to be aligned with the end of a corresponding feed duct in the carrier plate, said vertical coolant passage being connected to said first end of the coolant channel.

5. A mounting plate according to claim 4, wherein said vertical feed passage includes a portion of widened cross-section in the region of the bottom face of the mounting plate.

6. A mounting plate according to claim 2, wherein said coolant flow path means further includes a vertical coolant feed passage which extends from the bottom face of the mounting plate and is adapted to be aligned with the end of a corresponding feed duct in the carrier plate, said vertical coolant passage being connected to said first end of the coolant channel; and wherein said vertical feed passage leads into said radial feed passage close to said inner end of the radial feed passage.

7. A mounting plate according to any one of claims 1, 2 or 6, wherein the coolant channel is formed by a groove open at the top face of the mounting plate.

8. A mounting plate according to any one of claims 1, 2 or 6, including on the bottom face an annular groove to receive a heat-insulating plate.

9. A mounting plate according to any one of claims 1, 2 or 6, and including: a circular centering boss in the centre of at least one of the top and bottom faces of said mounting plate, and at least two fixing slots each in the shape of a circular arc and provided along the periphery of the mounting plate.

10. A mounting plate according to claim 5, and including: a circular centering boss in the centre of at least one of the top and bottom faces of said mounting plate, and at least two fixing slots each in the shape of a circular arc and provided along the periphery of the mounting plate; and wherein the widening of the cross-section of the vertical feed passage is formed approximately in the shape of a kidney and subtends at the centre of the mounting plate an angle which is at least as great as the angle $\beta$ subtended at the centre by one of said fixing slots.

* * * * *